United States Patent
Peterka et al.

(10) Patent No.: US 9,171,569 B2
(45) Date of Patent: Oct. 27, 2015

(54) METHOD AND APPARATUS FOR ASSISTING WITH CONTENT KEY CHANGES

(75) Inventors: Petr Peterka, San Diego, CA (US); Alexander Medvinsky, San Diego, CA (US); Paul Moroney, Olivenhain, CA (US); Rafie Shamsaasef, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1020 days.

(21) Appl. No.: 12/108,719

(22) Filed: Apr. 24, 2008

(65) Prior Publication Data

US 2008/0267398 A1  Oct. 30, 2008

Related U.S. Application Data

(60) Provisional application No. 60/914,421, filed on Apr. 27, 2007.

(51) Int. Cl.
*G11B 20/00* (2006.01)
*G11B 27/30* (2006.01)
(Continued)

(52) U.S. Cl.
CPC ...... *G11B 20/00086* (2013.01); *G11B 20/0021* (2013.01); *G11B 20/00166* (2013.01); *G11B 20/00507* (2013.01); *G11B 20/00731* (2013.01); *G11B 27/30* (2013.01); *H04N 7/1675* (2013.01); *H04N 21/2541* (2013.01); *H04N 21/4147* (2013.01); *H04N 21/4367* (2013.01);
(Continued)

(58) Field of Classification Search
CPC ........... H04N 21/8355; H04N 21/8456; G11B 2220/2516

USPC .............................. 726/27, 31; 380/200, 201
See application file for complete search history.

(56) References Cited

U.S. PATENT DOCUMENTS 6,005,938 A * 12/1999 Banker et al. .................. 380/239
2002/0080971 A1 * 6/2002 Fukami et al. ................ 380/277
(Continued)

FOREIGN PATENT DOCUMENTS

EP  1286349 A1  2/2003
EP  1447983 B1  12/2009
(Continued)

OTHER PUBLICATIONS

PR Newswire Dec. 15, 2003 PRISMIQ Introduces High-End Entertainmnet Gateway Produc, The PRISMIQ MediaPlayer/Recorder 2 pages.*

(Continued)

*Primary Examiner* — Ellen Tran
(74) *Attorney, Agent, or Firm* — Fenwick & West LLP (57) ABSTRACT

A process may be utilized by the DVR. The process receives a plurality of segments of a set of content and a plurality of corresponding content rule sets. Further, the process provides one or more instructions to record and encrypt the plurality of segments of the set of content on a storage medium. In addition, the process provides the plurality of content rule sets to the DRM component to be inserted into a locally generated and secured content license associated with the encryption of the set of content. The secured content license includes a master key and a list of the plurality of corresponding content rule sets that have been received in order of reception. The process receives a plurality of marker tokens from the DRM component in order to facilitate trick mode playback.

15 Claims, 9 Drawing Sheets

(51) Int. Cl.
*H04N 7/167* (2011.01)
*H04N 21/254* (2011.01)
*H04N 21/4147* (2011.01)
*H04N 21/436* (2011.01)
*H04N 21/4367* (2011.01)
*H04N 21/4408* (2011.01)
*H04N 21/4627* (2011.01)
*H04N 21/835* (2011.01)
*H04N 21/8355* (2011.01)
*H04N 21/845* (2011.01)

(52) U.S. Cl.
CPC ... *H04N21/43615* (2013.01); *H04N 21/43622* (2013.01); *H04N 21/4408* (2013.01); *H04N 21/4627* (2013.01); *H04N 21/835* (2013.01); *H04N 21/8355* (2013.01); *H04N 21/8456* (2013.01); *G11B 2220/2516* (2013.01)

(56) References Cited

U.S. PATENT DOCUMENTS

| | | | |
|---|---|---|---|
| 2002/0184506 | A1 | 12/2002 | Perlman |
| 2003/0215090 | A1 | 11/2003 | Saito et al. |
| 2004/0170278 | A1* | 9/2004 | Schipper ............ 380/239 |
| 2006/0047957 | A1* | 3/2006 | Helms et al. ............ 713/165 |
| 2006/0089912 | A1* | 4/2006 | Spagna et al. ............ 705/51 |
| 2006/0129909 | A1 | 6/2006 | Butt et al. |

FOREIGN PATENT DOCUMENTS

| | | |
|---|---|---|
| JP | 2001-351324 A | 12/2001 |
| JP | 2003-115832 A | 4/2003 |
| JP | 2003-281086 A | 10/2003 |
| JP | 2004-521428 A | 7/2004 |
| JP | 2004-247036 A | 9/2004 |
| JP | 2005-531238 A | 10/2005 |
| JP | 2006-513591 | 4/2006 |
| WO | WO-01/15163 A1 | 3/2001 |
| WO | WO-02-098133 A1 | 12/2002 |
| WO | 03/107665 A1 | 12/2003 |
| WO | 2006/114762 A2 | 11/2006 |

OTHER PUBLICATIONS

European Patent Office, Communication pursuant to Article 94(3) EPC, European Application No. 08746835.1, Apr. 15, 2010, 6 pages.
European Patent Office, Summons to Attend Oral Proceedings Pursuant to Rule 115(1) EPC, European Application No. 08746835.1, Apr. 8, 2011, 5 pages.
European Patent Office, Decision to Refuse a European Patent Application, European Application No. 08746835.1, Dec. 16, 2011, 8 pages.
European Patent Office, Provision of the Minutes in accordance with Rule 124(4) EPC, European Application No. 08746835.1, Dec. 16, 2011, 6 pages.
Japanese Office Action for JP Application No. 2010-506504, May 15, 2012, 6 pages, (with concise statement).
Japanese Office Action for JP Application No. 2010-506504, May 7, 2013, 4 pages (with concise statement).
Erman et al., "Call for Contributions on: Rights Management & Protection System Technologies," Internet Citation ftp://tva:tva PRG, Sep. 24, 2001, pp. 1-24.
PCT Search Report & Written Opinion, RE: Application #PCT/US2008/061485; Jul. 16, 2008.

* cited by examiner

METHOD AND APPARATUS FOR ASSISTING WITH CONTENT KEY CHANGES

RELATED APPLICATIONS

This application claims priority to U.S. Provisional Application Ser. No. 60/914,421 entitled "Assisting With Content Key Changes," filed on Apr. 27, 2007, the content of which is incorporated herein by reference in its entirety.

BACKGROUND

1. Field

This disclosure generally relates to the field of audio/visual content. More particularly, the disclosure relates to security for a device that stores audio/visual content.

2. General Background

Protected content is often recorded in an encrypted form on a recording device such as a Digital Video Recorder ("DVR"). However, if the content is protected by more than a single content encryption key ("CEK"), it may be difficult to find the correct encryption key during trick plays, e.g., fast forward, jump, skip, etc., and insert the encryption key in time to provide a smooth glitchless user experience. Current approaches do not facilitate such key transitions during trick play modes in a seamless fashion.

In a home setting, it is also reasonable that a second device may wish to access content stored on a home DVR. In many cases, the second device may wish to play back the content before the recording on the DVR is complete. For example, a second device may start playback of a scheduled two hour recording just thirty minutes after it begins. In addition, current approaches do not provide for the second device deriving content keys efficiently in a smooth and glitchless manner while the recording is still in progress.

SUMMARY

In one aspect of the disclosure, a process may be utilized by the DVR. The process receives a plurality of segments of a set of content and a plurality of corresponding content rule sets. Further, the process provides one or more instructions to record and encrypt the plurality of segments of the set of content on a storage medium. In addition, the process provides the plurality of content rule sets to the Digital Rights Management ("DRM") component to be inserted into a locally generated and secured content license associated with the set of content. The secured content license includes a master key and a list of the plurality of corresponding content rule sets that have been received in order of reception. The process receives a plurality of marker tokens from the DRM component. Each of the plurality of marker tokens indicates the content rule set corresponding to the segment of the set of content associated with the marker token such that a content encryption key is derived, at least in part, from the master key and the content rule set. The content encryption key is utilized to encrypt and decrypt the segment of the set of content corresponding to the content rule set. Finally, the process inserts the plurality of marker tokens into the DVR index file so that one of the marker tokens associated with one of the plurality of segments of the set of content is found during playback.

In another aspect, a process may be utilized by the DVR to interact with the remote client device. The process receives, at the DVR, a plurality of segments of a set of content and a plurality of corresponding content rule sets. Further, the process provides, at the DVR, one or more instructions to record and encrypt the plurality of segments of the set of content on a storage medium. In addition, the process provides, at the DVR, the plurality of content rule sets to the DRM component to be inserted into a locally generated and secured content license associated with the set of content. The secured content license includes a master key and a list of the plurality of corresponding content rule sets that have been received in order of reception. The process receives, at the DVR, a plurality of marker tokens from the DRM component. Each of the plurality of marker tokens indicates the content rule set corresponding to the segment of the set of content associated with the marker token such that a content encryption key is derived, at least in part, from the master key and the content rule set. The content encryption key is utilized to encrypt and decrypt the segment of the set of content corresponding to the content rule set. Further, the process inserts, at the DVR, the plurality of marker tokens into the DVR index file so that one of the marker tokens associated with one of the plurality of segments of the set of content is found during playback at the remote client device that communicates with the DVR to receive the set of content stored on the storage medium at the DVR. Finally, the process provides, from the DVR to the remote client device in a single secure transaction, the master key and a subset of the list of the plurality of corresponding content rule sets.

In yet another aspect, a process may be utilized by the DVR to interact with the diskless set top box ("STB"). The process receives, at the DVR from the diskless STB that receives a plurality of segments of a set of content and a plurality of corresponding content rule sets, a plurality of corresponding encrypted segments of the set of content as the diskless set top box receives and encrypts, based in part on a master key, each of the segments of the set of content. Further, the process receives, at the DVR from the diskless STB, a plurality of marker tokens. Each of the plurality of marker tokens indicates a content rule set corresponding to the segment of the set of content associated with the marker token such that a content encryption key is derived, at least in part, from the master key and the content rule set. The content encryption key is utilized to decrypt the segment of the set of content corresponding to the content rule set during playback. In addition, the process provides, at the DVR, one or more instructions to record, and decrypt during playback, the plurality of encrypted segments of the set of content on a storage medium. Finally, the process provides, at the DVR, the plurality of content rule sets to the DRM component to be inserted into a locally generated and secured content license associated with the set of content. The secured content license includes the master key and a list of the plurality of corresponding content rule sets that have been received in order of reception.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method and apparatus are disclosed that provide for assisting with content key changes. Recorded content is usually accompanied by a DVR index file that contains data about significant information and events, e.g., location of I-frames, changes in the program map table ("PMT"), etc. In one embodiment, a marker token is added to the index file, or similar file, that signals an upcoming key change. The marker token is inserted ahead of the actual key change so that the playback application has time to communicate with the DRM component to derive and load the content decryption key before the packet that requires the new key is to be decrypted. Therefore, the marker token allows the playback application to look ahead to detect upcoming key changes. Further, the playback application may scan the index file for marker tokens preceding the place of intended play locations so that the playback application can find the correct key during trick plays. While linear content playback may utilize the MPEG packet format to clearly indicate key changes with an odd/even state bit, non-linear playback, e.g., trick plays such as jumps to different portions of content, cannot rely on the MPEG packet format for key changes. A single bit is inadequate to determine what CEK is derived when trick modes are in use and the application jumps around in the content playback. In one embodiment, the information in the marker token includes a pointer into the content license list of content rule sets so that the correct CEK may be generated from the master key and the indicated rule set. Alternatively, the content rule set may be included directly in the marker token so that only the master key is required to generate the correct CEK. This rule set may include a relative timestamp, copy control information ("CCI") bits, and other rights information.

The marker token may be stored and read and/or sent in the clear because the CCI values are self authenticating. As the CCI values are utilized to derive the CEK, the encrypted content would not be decrypted properly if there was tampering with the marker token.

Figure 1:
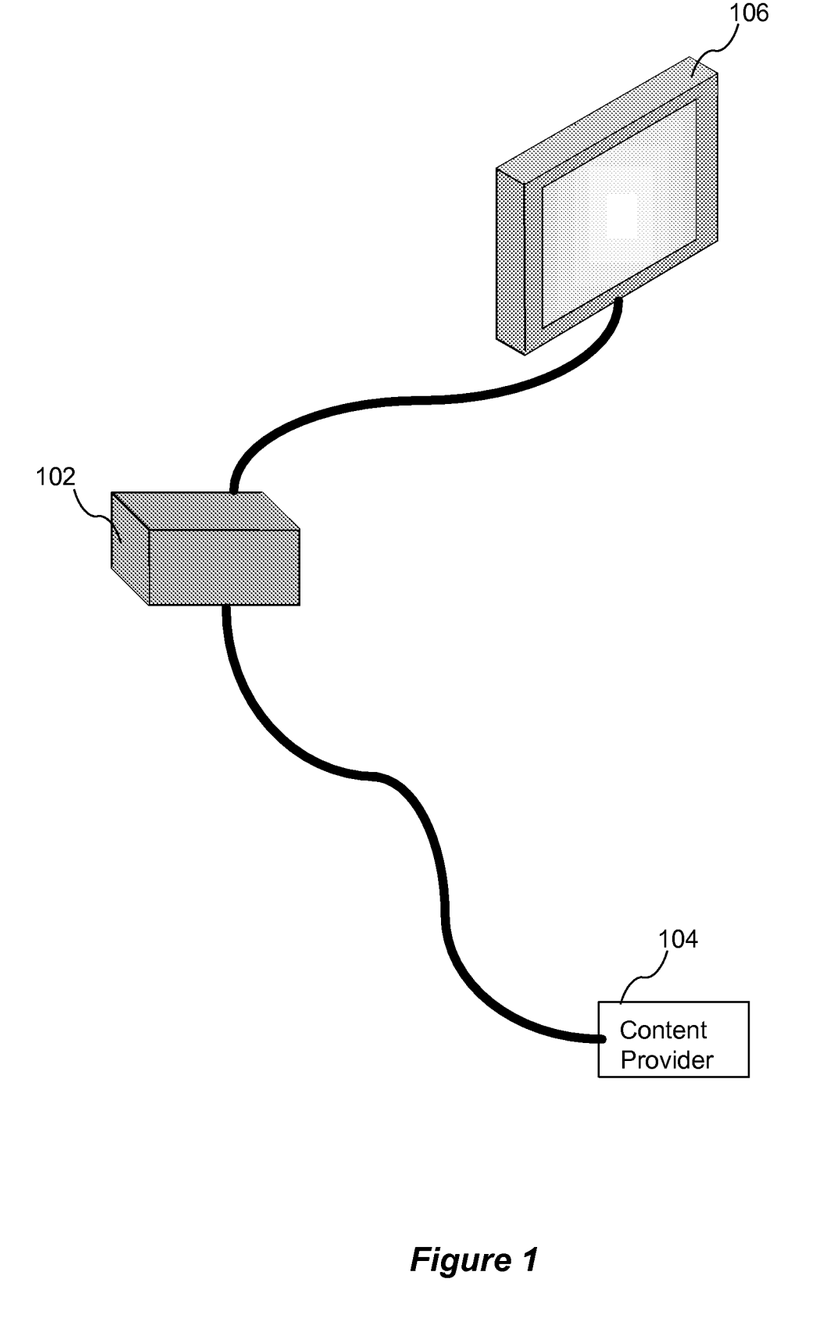
FIG. 1 illustrates a DVR environment.

FIG. 1 illustrates a DVR environment. A DVR 102 receives a set of content from a content provider 104. Further, the DVR 102 is operably connected to a display 106 so that the content may be viewed during playback. The DVR 102 may be any type of recorder utilized for recording digital video content. In addition, the DVR 102 may record the digital video content on to a hard drive, memory, or the like. Further, the DVR 102 may be implemented in or operably connected to a set top box, computing device, portable media player or the like. In addition, the display 106 may be a television, computer monitor, or the like. The set of content may be received in encrypted form from the content provider 104 and is decrypted prior to re-encryption and recording on the DVR 102. For example, the DVR 102 may be operably connected to and receive encrypted content from a CableCARD®. Alternatively, the DVR 102 may directly receive the content, e.g., from a USB module, rather than from the content provider 104. In yet another alternative configuration, the DVR 102 may receive the content from a device through a network, e.g., a home network. As an example, the content may be streamed from the device through the network to the DVR 102.

Figure 2A:
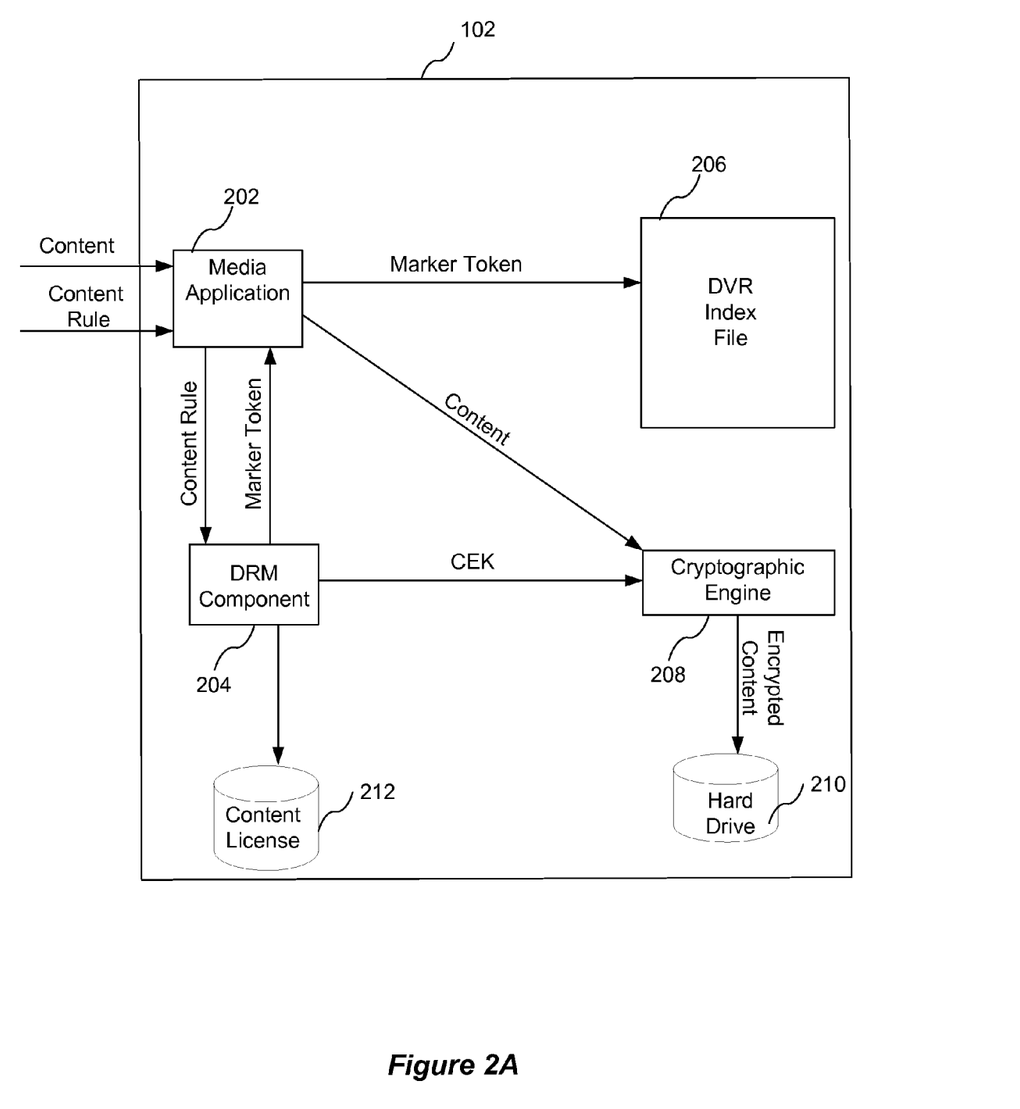
FIG. 2A illustrates an expanded view of the components of the DVR that are utilized during the recording of content.

FIG. 2A illustrates an expanded view of the components of the DVR 102 that are utilized during the recording of content. In one embodiment, the DVR 102 has a media application 202 that triggers the sequence of recording content. The media application 202 receives a set of content. Further, the media application receives CCI data indicating a content rule for the content. The content rule may be a restriction on the use of the content and results in a corresponding output protection rule. The media application may also receive CCI updates as the content is received. In other words, the content rules may change for different portions of the content. The media application 202 determines the type of the input stream to initialize an object that collects content data. For example, if the DVR 102 receives CCI data from a CableCARD®, the recorder application determines that the CCI data is from a CableCARD® and initializes an object to gather the CCI data from the CableCARD®.

The DVR 102 may also have a DRM component 204 that manages the rights of the content to be recorded. Accordingly, the media application 202 provides the content rule initially received to the DRM component 204. Further, the DRM component 204 generates a marker token, which is an indication of when a key change is to occur during playback. In one embodiment, the media application 202 requests that the DRM 204 component generate the marker token. The DRM component 204 creates an entry in a content license associated with the content. If the content license is stored in the DVR 102, the DRM component 204 may directly create the entry in the content license. For instance, the content license may be stored on a storage medium 212. Alternatively, if the content license is stored on a server in communication with the DRM component 204, then the DRM component 204 may request that the server creates the entry in the content license. The DRM component 204 then sends the marker token to the media application 202. Further, the DRM component 204 provides a content encryption key ("CEK") to a cryptographic engine 208, which utilizes the CEK to encrypt the content prior to the content being recorded on a hard drive 210. If the content is received in an encrypted form, the cryptographic engine 208 may decrypt the content, e.g., remove conditional access ("CA") encryption (or alternatively CableCARD® interface encryption), and then re-encrypt the content for recording. This allows the recording CEK to be directly associated with the recording, and the rights related to it. For instance, the content is re-encrypted with a new randomly generated key so that each new recording of the content is encrypted with a unique key. This way, if a key from only a single device is stolen, it can only be used to decrypt one particular copy of that content that is stored only on that one device. Accordingly, the cryptographic engine 208 may decrypt the encrypted content and re-encrypt the content. In one embodiment, the content is received from the media application 202. In another embodiment, the content is received independently of the media application 202.

The media application 202 may store the marker token in a DVR index file 206, or similar file, associated with the content. In one embodiment, the media application 202 has an index file generator to generate the index file. In another embodiment, the index file is generated independently of the media application 202, e.g., the index file may be transmitted to the media application along with the content. Alternatively, or additionally, the media application 202 may insert the marker token into a stream of content as opposed to a DVR index file 206. Further, the CCI data may not have been received by the start of the recording, and a software application on the DVR 102 may provide an initial default content rule to the DRM component 204 to generate a CEK and create a content license. However, if the actual CCI data is not received afterwards within a certain period of time, the DVR application may deny the recording.

In one embodiment, the marker token may be a tag. Further, the marker token may include a data set having information such as CCI data, a key identifier ("KeyID"), and a relative time stamp from the start of the recording.

The KeyID is a CCI data identifier in the DRM content license. At the start of a recording, the KeyID is set to zero and associated with the default value for CCI data. Once the DRM component 204 receives a CCI update message, the DRM component 204 may update the content license accordingly.

Further, the time stamp is a relative time stamp from which the new encryption key and the CCI data are valid. The first time stamp may be set to zero. The content license includes the absolute time of day for the start of the recording. As a result, the absolute time of day can be calculated for each marker token. Each CEK associated with a content segment and a corresponding marker token may be associated with an expiration time to control the lifetime of the recorded content or each one of the segments.

The marker token identifies the CEK. At the start of a recording, the KeyID is set to zero. Further, the KeyID is incremented by one for each additional marker token within the same content recording. In another embodiment, the KeyID may be a random number.

In one embodiment, the marker token is inserted into an index file 204 as part of a bookmark. The content of the DVR index file 206 are available to a remote device during content streaming sessions.

The encrypted content should indicate which CEK is needed to decrypt it. Further, the encrypted content may contain the actual KeyID in each packet. In another embodiment, the content indicates the odd/even scrambling bit in the MPEG-2 packet header to indicate that a new key is being utilized. The odd/even parity is equal to the least significant bit of the KeyID. Thus, the marker token indicates how to prepare a new CEK in advance of a change in key, and the odd/even parity bit of the MPEG packet header indicates the exact usage time.

Accordingly, the marker token may be utilized to derive one or more keys needed to encrypt a segment of the content media file identified by the relative time stamp. A plurality of marker tokens may be utilized for a plurality of segments so that each segment has a corresponding marker token inserted. In an alternative embodiment, the marker token may be refreshed periodically to comply with a maximum pause limit requirement for content tagged with copy never rules.

In one embodiment, the DRM component 204 sends the marker token to the media application 202. Further, the media application 202 inserts the marker token into the DVR index file 206. In addition, the DRM component 204 loads an encryption engine 208 with one or more content keys that may be utilized to encrypt content that is recorded by the DVR 102. In other words, the DRM component 204 sends a CEK to the cryptographic engine 208 to encrypt content with. Further, once the recording is completed, the DVR 102 may request that the DRM component 204 terminates the encryption process.

Figure 2B:
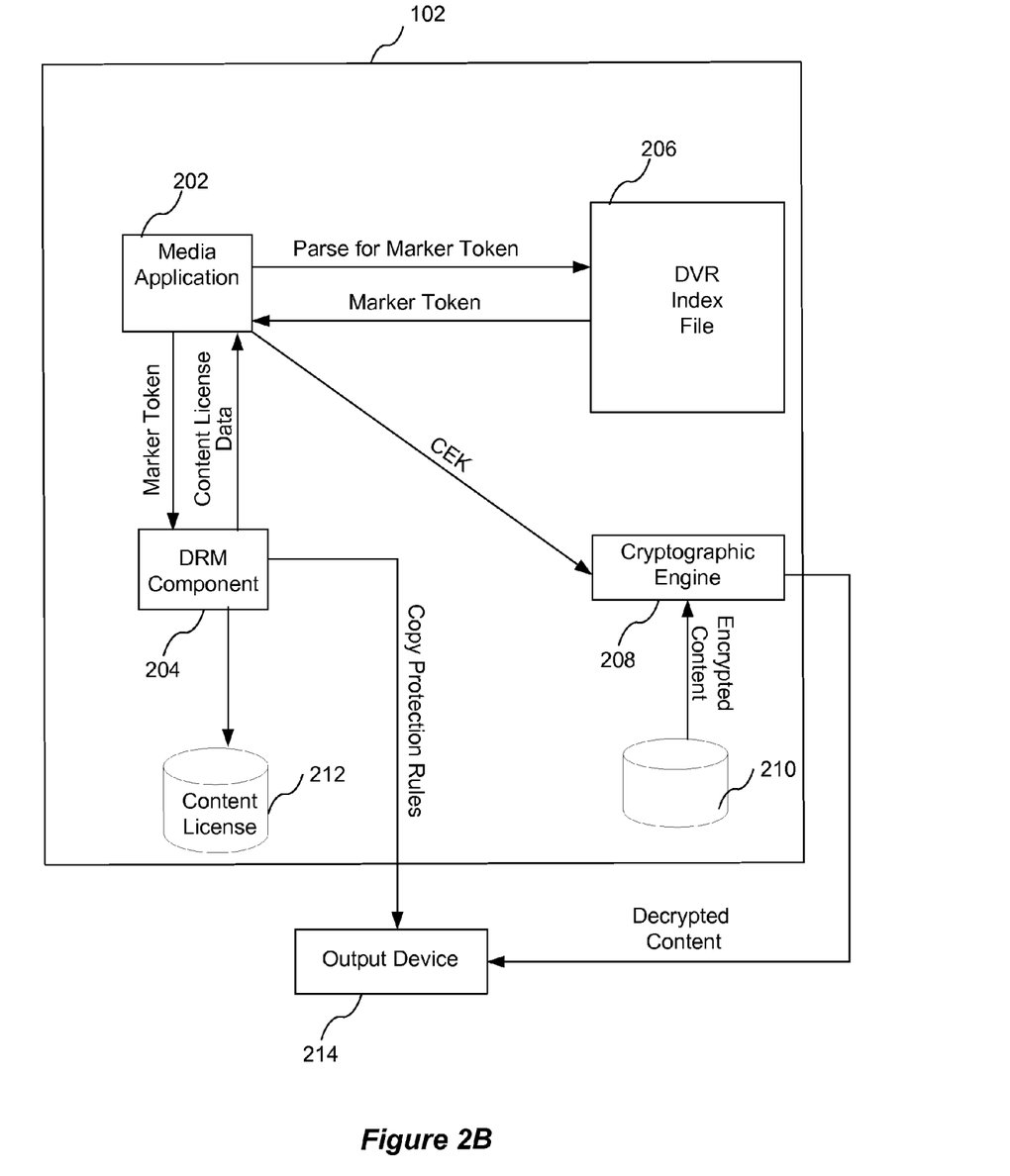
FIG. 2B illustrates an expanded view of the components of the DVR that are utilized during the local playback of content.

FIG. 2B illustrates an expanded view of the components of the DVR 102 that are utilized during the local playback of content. The media application 202 triggers playback of the content recorded on the hard drive 210. The media application 202 requests the content license data from the DRM component 204 to play the content. For example, the media application 202 may provide a file name to the DRM component 204 during playback initialization to look for a content license corresponding to the content. For instance, the DRM component 204 may verify the play request against the content license and return a valid SessionID, e.g., a randomly generated unsigned sixty four bit integer value identifying the secure session, upon approval. The SessionID may be utilized by the media application 202 for any subsequent calls to the DRM component 204.

For each segment of the recorded content, the media application 202 parses through the DVR index file 206 to find the marker token for the current segment. In one embodiment, the media application 202 may create an index file parser to accomplish this parsing. Accordingly, the media application 202 retrieves the marker token associated with the current segment from the DVR index file 206. The media application 202 provides the marker token to the DRM component 204 to request the content license data to play the content for the segment associated with the marker token. The content license data includes data such as the CCI data and the key used to derive the CEK for the encrypted content of the current segment.

Further, the media application 202 may request that the DRM component 204 verify the rights and set the cryptographic engine 208 with the proper CEK from the content license for the current segment of the content.

Once the media application 202 identifies a proper output device 214 for the content, the media application 202 requests that the DRM component 204 set appropriate copy protection data for the output device 214. Accordingly, the DRM component 204 sends copy protection rules to the output device 214. If there is more than one output device 214, the media application 202 repeats the process for each output. In one embodiment, the DRM component 204 sets the CEK for the corresponding marker token directly into the cryptographic engine 208 for decryption of the encrypted content on the hard drive 210. Once the playback is completed, the media application 202 requests that the DRM component 204 terminate its session.

The DVR 102 allows a user to view a seamless presentation of content with trick plays. For instance, if the user fast scans through different segments, the DVR 102 can retrieve the appropriate CEKs for decryption as the user is fast scanning through the content. A similar process is performed for the reverse scan operation, but in the opposite direction. If the user requests a jump to a particular location in the content, the DVR 102 will know the location and can quickly find the corresponding marker token in the DVR index file 206 in order to derive the correct CEK for that content segment.

Figure 3A:
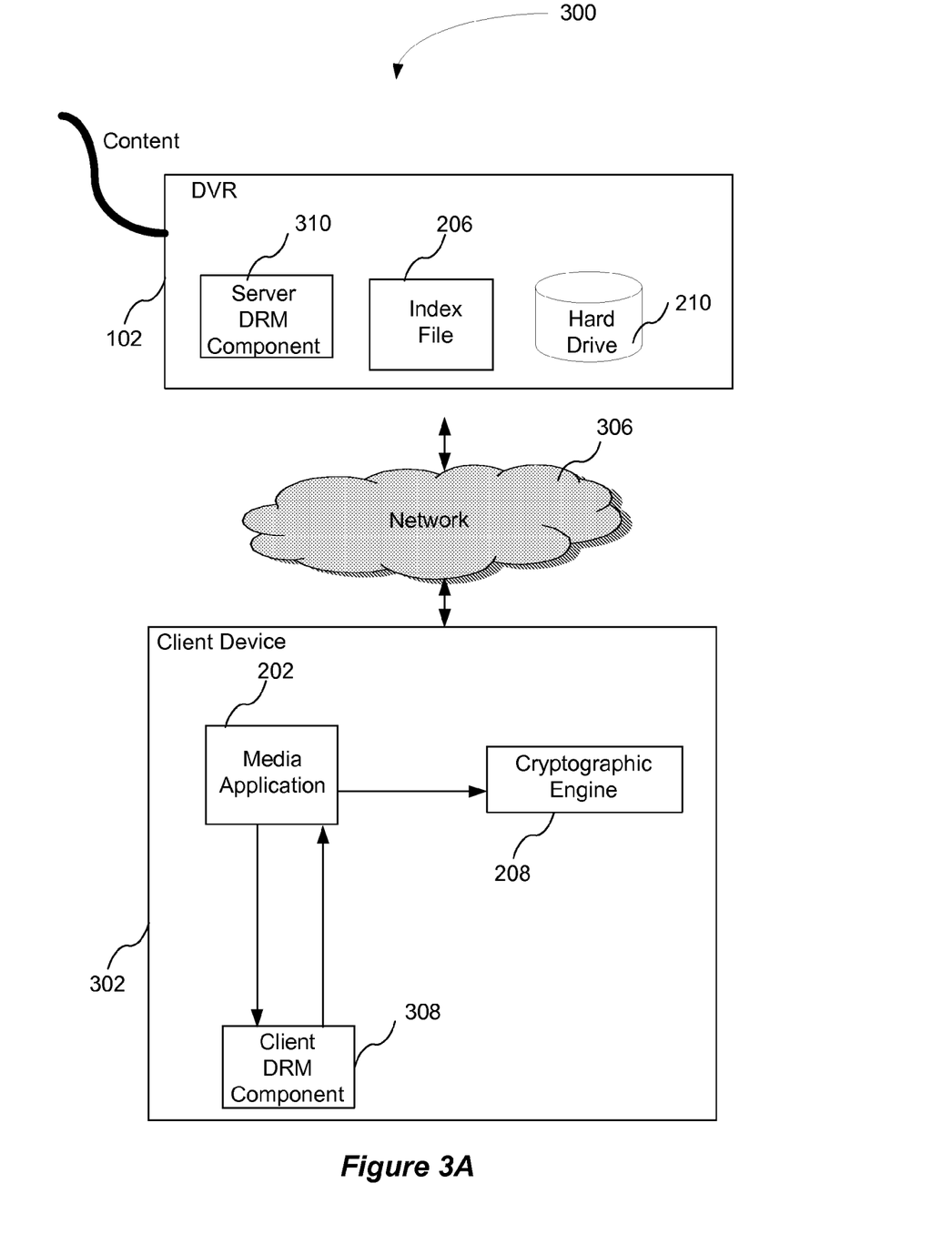
FIG. 3A illustrates a configuration in which the DVR may also be utilized for remote playback by another device.

FIG. 3A illustrates a configuration 300 in which the DVR 102 may also be utilized for remote playback by another device. The marker token may be utilized when the DVR 102 performs live recording and remote playback of content, i.e., an incomplete recording. When a piece of content is played back on a second device, e.g., a client device 302, while still being recorded on the DVR 102, the client device 302 receives the content master key and the list of associated content rule sets during an initial secure transaction with the DVR 102. However, the client device 302 does not obtain the entire list of content rule sets for the recording, as those rules may still change during the remainder of the recording. When the rules change, the marker token is created and then delivered to the client device 302 prior to the associated content being streamed. Thus, each marker token, which includes the relevant content rule set, e.g., CCI data, is delivered in advance to the client device 302 while the content is streamed so that the client device 302 can derive the CEKs in real time and set the output copy protection on its outputs. This approach is far more efficient than delivering the master key and currently updated content rule sets in additional secure transactions with the DVR 102. Such transactions would require substantially additional processing for both the DVR 102 and the client device 302. In addition, for this case, the marker token must include the content rule set, and not the alternative pointer.

The marker token may also be utilized for the case of a second device, e.g., the client device 202 in the home, when it requests playback of content recorded and stored on the DVR, i.e., a complete recording, as opposed to a live recording. The client device 202 requests the master key and all the associated content rule sets from the DVR 102 via a single secure transaction, after which the content is streamed from the DVR to the client device 202. The DVR index file 206, including the marker tokens, can also be sent to the client device 302 so that trick modes can be supported at the client device 302.

The media application 202, a client DRM component 308, and the cryptographic engine 208 may be part of a client device 302. Further, the DVR index file 206, the hard drive 210, and a corresponding server DRM component 310 may be part of a DVR 102. In other words, both the DVR 102 and the client device 302 may have a DRM component that communicates with each other in order to share the master key and content rule sets.

The client device 302 may communicate with the DVR 102 through a network 306. An example of the network 306 is a home network. Accordingly, the media application 202 may request content that is stored on the hard drive 210 and communicate with the hard drive 210 through the network 306. Further, the DRM component 204 may need to obtain the master key and content rule sets associated with content from the corresponding DRM component 204 on the DVR 102. Many of the operations will be similar to local playback except that communication is performed between components through the network 306. Alternative embodiments may include configurations in which different combinations of components are placed on the client device 302 and the DVR 102.

In any of the configurations described above, the marker token may be communicated in the clear, i.e., not encrypted or signed. Further, in a network configuration, the marker token may be transferred to all viewing parties, i.e., all client devices participating in playback, ahead of time to optimize the performance of CEK derivation and avoid glitches. The reason why the marker token can be handled by an application in an unprotected way is that it is indirectly authenticated by the CEK derivation functions. In other words, if the wrong marker token is used or if someone manipulates the CCI data to gain illicit access to the content, the wrong CEK will be derived and the content segment cannot be decrypted.

Figure 3B:
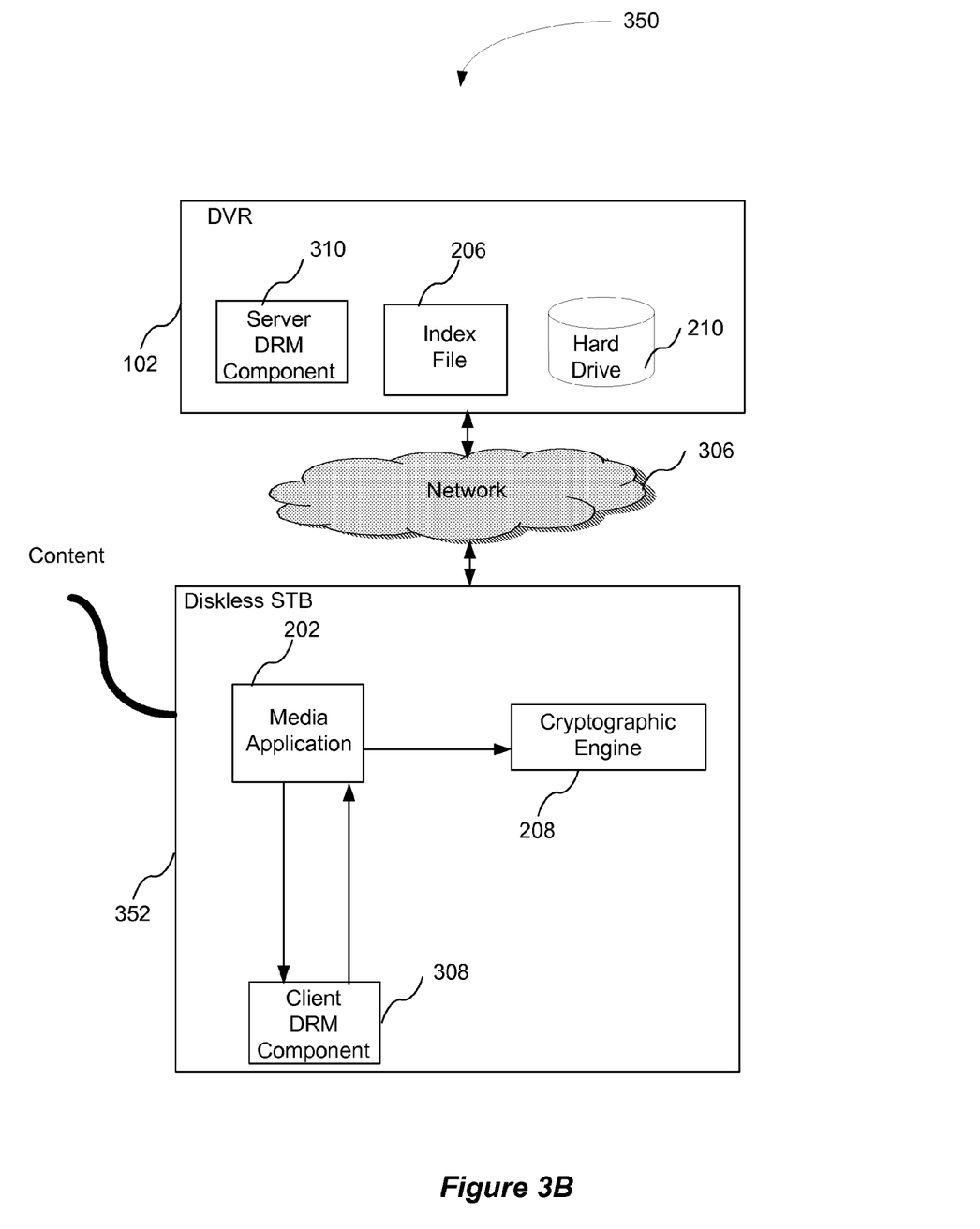
FIG. 3B illustrates a configuration in which the DVR may also be utilized for remote recording by another device.

FIG. 3B illustrates a configuration 350 in which the DVR 102 may also be utilized for remote recording by another device. The marker token may also be used in the case of a diskless set top box 352, i.e., a STB with no hard drive, that is being used to tune and demodulate content that is ultimately going to be streamed to, recorded, and stored on the DVR 102. In this case, after removing CA encryption (or alternatively CableCARD® interface encryption), the diskless STB 352 will still encrypt the content for the hard drive 210, and stream the newly encrypted content to the DVR 102. The master key for this content recording will be obtained in advance from the DVR 102 via a single secure transaction, or generated and sent to the DVR via that secure transaction. After that, CEKs will be generated in the diskless STB 352 to enable content encryption, and the associated content rule sets will be sent over to the DVR 102 as marker tokens. For this case, the DVR 102 will construct the secured local license from the master key and content rule sets as they arrive. In addition, for this case, the marker token must include the content rule set, and not the alternative pointer.

Figure 4:
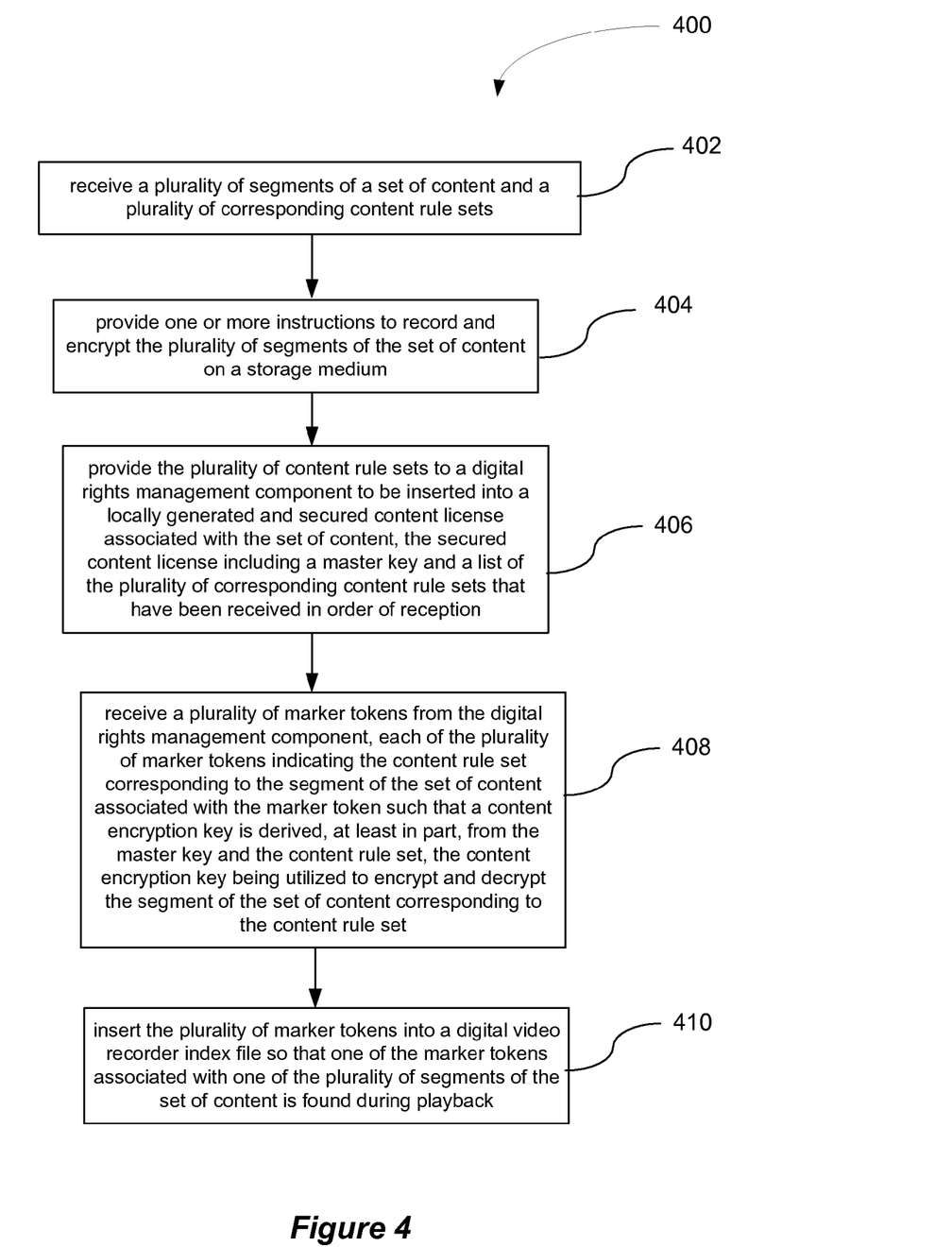
FIG. 4 illustrates a process that may be utilized by the DVR.

FIG. 4 illustrates a process 400 that may be utilized by the DVR 102. At a process block 402, the process 400 receives a plurality of segments of a set of content and a plurality of corresponding content rule sets. Further, at a process block 404, the process 400 provides one or more instructions to record and encrypt the plurality of segments of the set of content on a storage medium. In addition, at a process block 406, the process 400 provides the plurality of content rule sets to the DRM component 204 to be inserted into a locally generated and secured content license associated with the set of content. The secured content license includes a master key and a list of the plurality of corresponding content rule sets that have been received in order of reception. At a process block 408, the process 400 receives a plurality of marker tokens from the DRM component 204. Each of the plurality of marker tokens indicates the content rule set corresponding to the segment of the set of content associated with the marker token such that a content encryption key is derived, at least in part, from the master key and the content rule set. The content encryption key is utilized to encrypt and decrypt the segment of the set of content corresponding to the content rule set. Finally, at a process block 410, the process 410 inserts the plurality of marker tokens into the DVR index file 206 so that one of the marker tokens associated with one of the plurality of segments of the set of content is found during playback.

Figure 5:
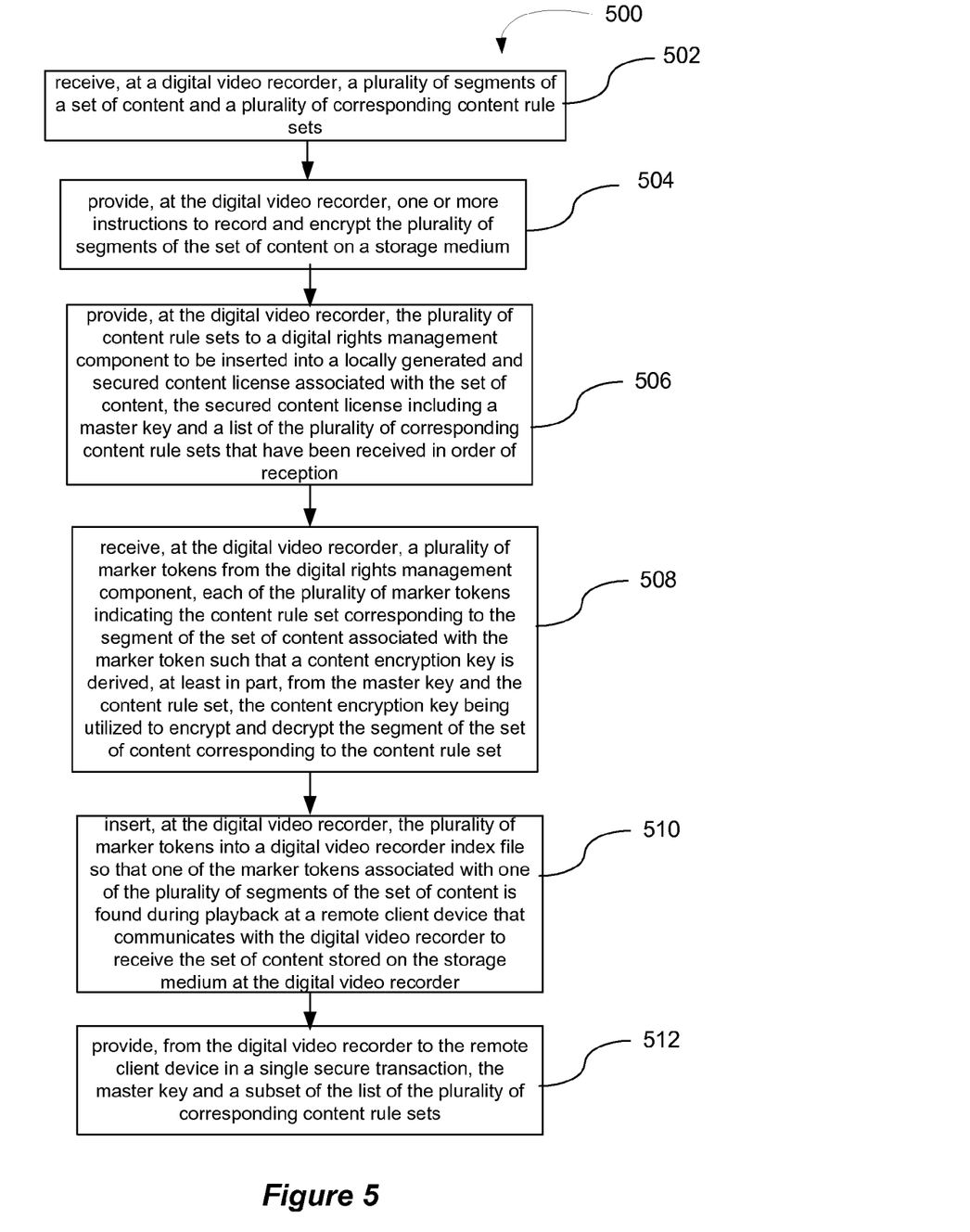
FIG. 5 illustrates a process that may be utilized by the DVR to interact with the remote client device.

FIG. 5 illustrates a process 500 that may be utilized by the DVR 102 to interact with the remote client device 302. At a process block 502, the process 500 receives, at the DVR 102, a plurality of segments of a set of content and a plurality of corresponding content rule sets. Further, at a process block 504, the process 500 provides, at the DVR 102, one or more instructions to record and encrypt the plurality of segments of the set of content on a storage medium. In addition, at a process block 506, the process 500 provides, at the DVR 102, the plurality of content rule sets to DRM component 204 to be inserted into a locally generated and secured content license associated with the set of content. The secured content license includes a master key and a list of the plurality of corresponding content rule sets that have been received in order of reception. At a process block 508, the process 500 receives, at the DVR 102, a plurality of marker tokens from DRM component 204. Each of the plurality of marker tokens indicates the content rule set corresponding to the segment of the set of content associated with the marker token such that a content encryption key is derived, at least in part, from the master key and the content rule set. The content encryption key is utilized to encrypt and decrypt the segment of the set of content corresponding to the content rule set. Further, at a process block 510, the process 500 inserts, at the DVR 102, the plurality of marker tokens into the DVR index file 206 so that one of the marker tokens associated with one of the plurality of segments of the set of content is found during playback at the remote client device 302 that communicates with the DVR 102 to receive the set of content stored on the storage medium at the DVR 102. Finally, at a process block 512, the process 500 provides, from the DVR 102 to the remote client device 302 in a single secure transaction, the master key and a subset of the list of the plurality of corresponding content rule sets.

Figure 6:
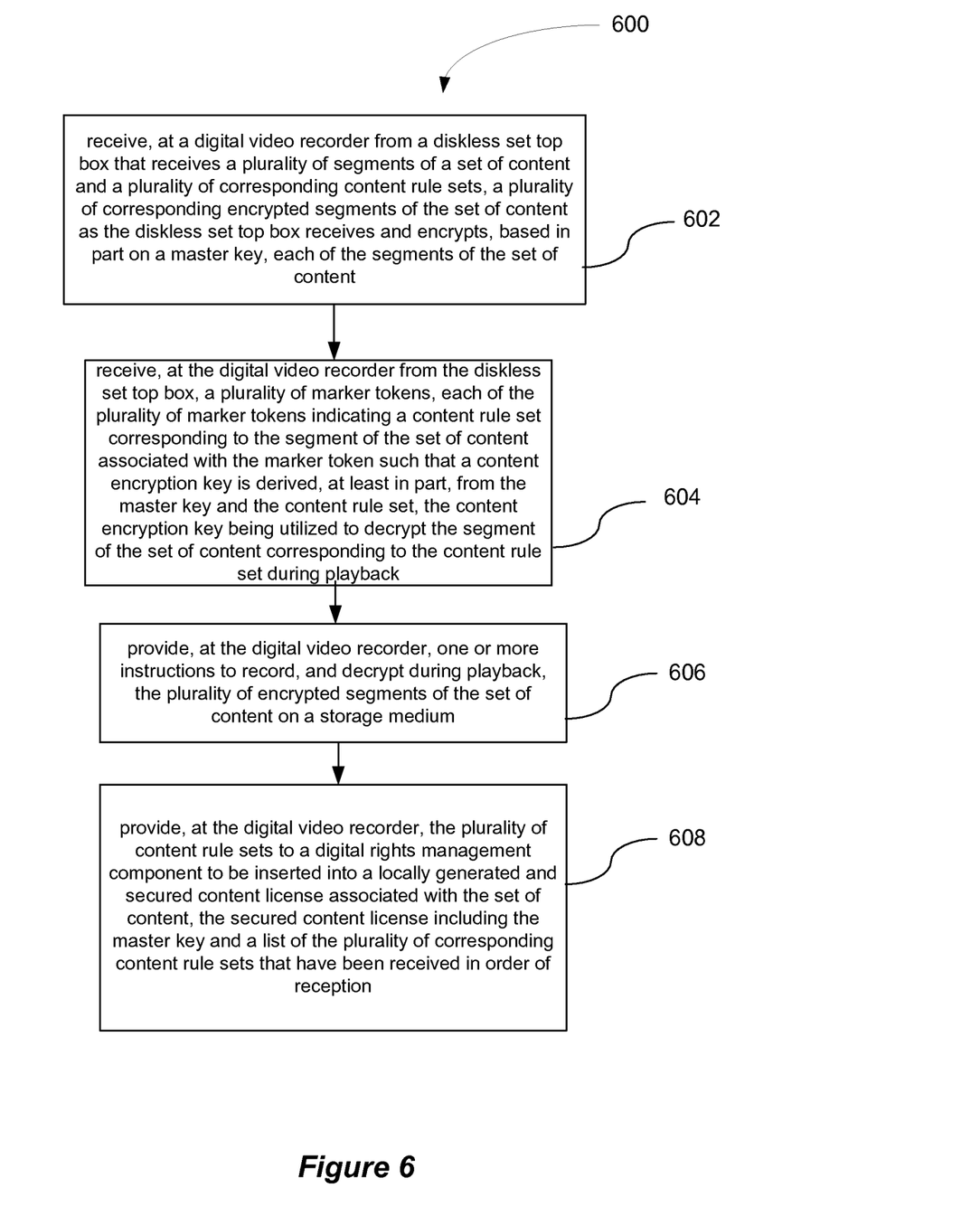
FIG. 6 illustrates a process that the DVR utilizes to interact with the diskless STB.

FIG. 6 illustrates a process 600 that the DVR 102 utilizes to interact with the diskless STB 352. At a process block 602, the process 600 receives, at the DVR 102 from the diskless STB 352 that receives a plurality of segments of a set of content and a plurality of corresponding content rule sets, a plurality of corresponding encrypted segments of the set of content as the diskless set top box receives and encrypts, based in part on a master key, each of the segments of the set of content. Further, at a process block 604, the process 600 receives, at the DVR 102 from the diskless STB 352, a plurality of marker tokens. Each of the plurality of marker tokens indicates a content rule set corresponding to the segment of the set of content associated with the marker token such that a content encryption key is derived, at least in part, from the master key and the content rule set. The content encryption key is utilized to decrypt the segment of the set of content corresponding to the content rule set during playback. In addition, at a process block 606, the process 600 provides, at the DVR 102, one or more instructions to record, and decrypt during playback, the plurality of encrypted segments of the set of content on a storage medium. Finally, at a process block 608, the process 600 provides, at the DVR 102, the plurality of content rule sets to the DRM component 204 to be inserted into a locally generated and secured content license associated with the set of content. The secured content license includes the master key and a list of the plurality of corresponding content rule sets that have been received in order of reception.

Figure 7:
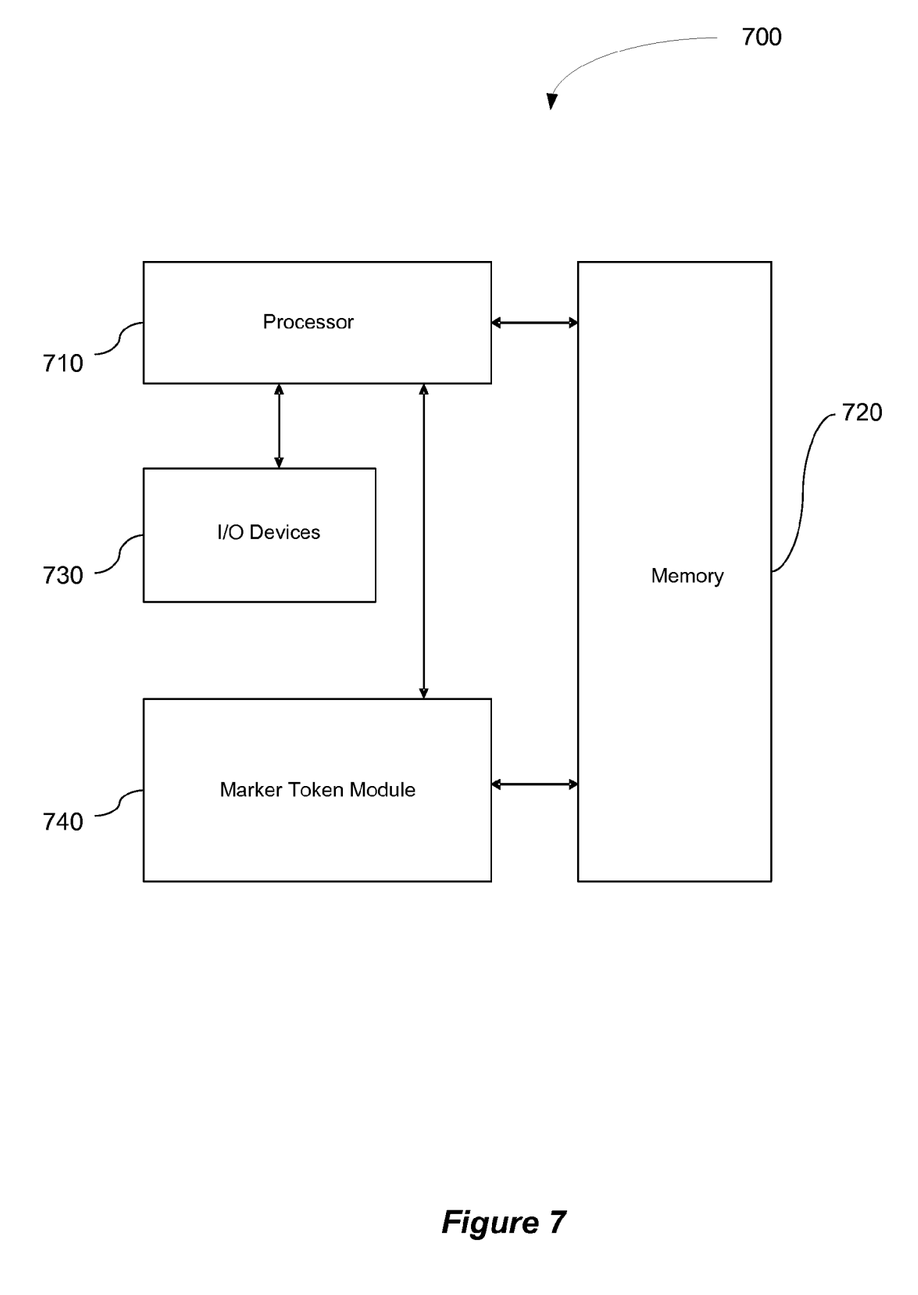
FIG. 7 illustrates a block diagram of a station or system that provides marker token composition.

FIG. 7 illustrates a block diagram of a station or system 700 that provides marker token composition. In one embodiment, the station or system 700 is implemented using a general purpose computer or any other hardware equivalents. Thus, the station or system 700 comprises a processor 710, a memory 720, e.g., random access memory ("RAM") and/or read only memory (ROM), a marker token module 740, and various input/output devices 730, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). The marker token module 740 may include one or more processors, and/or corresponding code.

It should be understood that the marker token module 740 may be implemented as one or more physical devices that are coupled to the processor 710 through a communication channel. Alternatively, the marker token module 740 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 720 of the computer. As such, the marker token module 740 (including associated data structures) of the present disclosure may be stored on a computer readable medium, e.g., RAM memory, magnetic or optical drive or diskette and the like.

It is understood that the marker token composition approach described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

We claim:

1. A method comprising:
receiving a plurality of segments of a set of content and a plurality of corresponding content rule sets;
providing the plurality of content rule sets to a digital rights management component, wherein the digital rights management component is configured to insert the plurality of content rule sets into a content license associated with the set of content, the content license including a master key;
receiving a plurality of marker tokens from the digital rights management component, each marker token of the plurality of marker tokens associated with a segment of the plurality of segments and a corresponding content rule set of the plurality of content rule sets, and each marker token of the plurality of marker tokens associated with a segment of the plurality segments indicating when a content encrypting key associated with the segment is to change during playback of the associated segment, wherein a marker token associated with a segment includes the corresponding content rule set within the marker token, and the content encryption key for the segment is derived from the master key; and
inserting the plurality of marker tokens into a digital video recorder index file so that one of the marker tokens associated with one of the plurality of segments of the set of content is detected during playback.

2. The method of claim 1, wherein the content encryption key for the segment is used to encrypt and decrypt the segment according to the corresponding content rule set.

3. The method of claim 1, further comprising providing instructions to a cryptographic component for recording and encrypting the plurality of segments of the set of content on a storage medium, wherein the storage medium is a hard drive.

4. The method of claim 1, further comprising receiving a request to play back the set of content, finding in the digital video recorder index file an initial marker token corresponding to an initial encrypted segment of the content, determining the content encryption key corresponding to the initial encrypted segment of the content, and providing an instruction to decrypt the initial encrypted segment of the content.

5. The method of claim 1, further comprising receiving a request to play back a portion of the set of content, finding in the digital video recorder index file the marker token corresponding to an encrypted segment of the requested content, determining the content encryption key corresponding to the encrypted segment of the requested content, and providing an instruction to decrypt the encrypted segment of the requested content.

6. The method of claim 5, wherein the marker token includes a key identifier that indicates the content encryption key that decrypts the encrypted segment.

7. The method of claim 5, wherein a packet header of the content includes a parity bit that indicates usage time of the content encryption key to decrypt the encrypted segment.

8. A method comprising:
receiving, at a digital video recorder, a plurality of segments of a set of content and a plurality of corresponding content rule sets;
providing, at the digital video recorder, the plurality of content rule sets to a digital rights management component, wherein the digital rights management component is configured to insert the plurality of content rule sets into a content license associated with the set of content, the content license including a master key;
receiving, at the digital video recorder, a plurality of marker tokens from the digital rights management component, each marker token of the plurality of marker tokens being associated with a segment of the plurality of segments and a corresponding content rule set of the plurality of content rule sets, and each marker token of the plurality of marker tokens associated with a segment of the plurality segments indicating when a content encrypting key associated with the segment is to change during playback of the associated segment, wherein a marker token associated with a segment includes the corresponding content rule set within the marker token, and the content encryption key for the segment is derived from the master key;

inserting, at the digital video recorder, the plurality of marker tokens into a digital video recorder index file so that one of the marker tokens associated with one of the plurality of segments of the set of content is detected during playback at a remote client device that communicates with the digital video recorder to receive the set of content stored on a storage medium at the digital video recorder; and providing, from the digital video recorder to the remote client device, the master key and a subset of the list of the plurality of corresponding content rule sets.

9. The method of claim 8, wherein the subset of the list of the plurality of corresponding content rule sets is the entire list of the plurality of corresponding content rule sets if the set of content has been completely recorded by the digital video recorder.

10. The method of claim 9, wherein the content encryption key for the segment is used to encrypt the segment according to the corresponding content rule set.

11. The method of claim 8, further comprising providing instructions to a cryptographic component for recording and encrypting the plurality of segments of the set of content on a storage medium, wherein the storage medium is a hard drive located in the digital video recorder.

12. The method of claim 8, wherein the subset of the list of the plurality of corresponding content rule sets is a portion of the list of the plurality of corresponding content rule sets if the set of content has not been completely recorded by the digital video recorder.

13. The method of claim 8, further comprising sending an additional marker token to the remote client device and an additional content segment to the remote client device.

14. A method comprising:

receiving, at a digital video recorder from a diskless set top box, a plurality of encrypted segments of a set of content and a plurality of corresponding content rule sets, the plurality of segments of the set of content encrypted by the diskless set top box based in part on a master key;

receiving, at the digital video recorder from the diskless set top box, a plurality of marker tokens, each marker token of the plurality of marker tokens being associated with a segment of the plurality of segments and a corresponding content rule set of the plurality of content rule sets, and each marker token of the plurality of marker tokens associated with a segment of the plurality segments indicating when a content encrypting key associated with the segment is to change during playback of the associated segment, wherein a marker token associated with a segment includes the corresponding content rule set within the marker token, and the content encryption key for the segment is derived from the master key; and providing, at the digital video recorder, the plurality of content rule sets to a digital rights management component, wherein the digital rights management component is configured to insert the plurality of content rule sets into a content license associated with the set of content, the content license including the master key.

15. The method of claim 14, further comprising providing, from the digital video recorder to the diskless set top box, the master key in a single secure transaction.

\* \* \* \* \*